United States Patent
Mao et al.

(10) Patent No.: US 8,719,219 B2
(45) Date of Patent: May 6, 2014

(54) MANAGING FEED IN IN-MEMORY DATABASE SYSTEM

(75) Inventors: Huaiyang Mao, Schriesheim (DE); Rolf Schumann, Bad Schonborn (DE); Eduard Hess, Wiesloch (DE); Martin Zielonkowski, Freinsheim (DE); Sonja Zscherpel, Forst (DE); Arnulf Schueler, Heidelberg (DE); Thomas Maag, Reilingen (DE); Lan Zhang, Wiesloch (DE); Sven-Eric Eigemann, Sandhausen (DE); Dagmar Opitz, Sandhausen (DE)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 13/613,416

(22) Filed: Sep. 13, 2012

(65) Prior Publication Data

US 2014/0074784 A1    Mar. 13, 2014

(51) Int. Cl.
G06F 17/30    (2006.01)
(52) U.S. Cl.
USPC .......................................... 707/609; 707/626
(58) Field of Classification Search
USPC ................................................. 707/609, 626
See application file for complete search history.

(56) References Cited

U.S. PATENT DOCUMENTS

| | | | |
|---|---|---|---|
| 7,421,454 B2 * | 9/2008 | DeShan et al. ........................ 1/1 |
| 8,126,904 B1 * | 2/2012 | Bettinger et al. ............. 707/758 |
| 8,432,808 B1 * | 4/2013 | Dankberg et al. ............. 370/235 |
| 8,634,805 B2 * | 1/2014 | Raleigh .......................... 455/406 |
| 2002/0133381 A1 * | 9/2002 | Tso ................................... 705/5 |
| 2004/0002988 A1 | 1/2004 | Seshadri et al. |
| 2007/0233728 A1 | 10/2007 | Puteick et al. |
| 2008/0120129 A1 | 5/2008 | Seubert et al. |
| 2010/0082497 A1 | 4/2010 | Biesemann et al. |
| 2012/0047079 A1 | 2/2012 | Biesemann et al. |
| 2012/0079004 A1 | 3/2012 | Herman |
| 2013/0218979 A1 * | 8/2013 | Vins et al. ..................... 709/206 |
| 2013/0218980 A1 * | 8/2013 | Vins et al. ..................... 709/206 |
| 2013/0219292 A1 * | 8/2013 | Vins et al. ..................... 715/751 |

FOREIGN PATENT DOCUMENTS

EP    1411446    4/2004

OTHER PUBLICATIONS

SAP AG, "Enterprise Controlling (EC)—Release 4.6C," 2001, 29 pages.
McNulty, "ABAP—XML Mapping," SAP Labs, LLC, 2004, 79 pages.
SAP AG, "The Enhancement Framework for Nordic User group," 2006, 117 pages.
SAP AG, "Basic Settings for SAP Transportation Management," 2010, pp. 5, 42-44.
SAP AG, "SAP High-Performance Analytic Appliance (SAP Hana) FAQ," 2010, 10 pages.
SAP, "Introducing the SAP High-Performance Analytic Appliance (HANA)," 2011, 3 pages.

(Continued)

*Primary Examiner* — Kim Nguyen
(74) *Attorney, Agent, or Firm* — Fish & Richardson P.C.

(57) ABSTRACT

A computer-implemented method for managing a feed in an in-memory database system includes: determining, in an in-memory database system, that a criterion for a feed event is met with regard to a business object handled by the in-memory database system; generating a feed event document in response to the determination; identifying at least one user in the in-memory database system who is a feed event subscriber regarding the business object; and forwarding the generated feed event document to the identified at least one feed event subscriber.

16 Claims, 13 Drawing Sheets

(56) References Cited

OTHER PUBLICATIONS

SAP, "SAP Business Objects—Widgets for SAP Business Objects User Guide" 2011, 38 pages.
Kazi and Zinow, "SAP Influencer Summit 2010," SAP, 2011, 10 pages.
SAP, "SAP Sales on Demand," 2011, 8 pages.
SAP AG, "SAP Harnesses the Power of SAP Hana Platform to Deliver New Real-time Applications," 2011, 3 pages.
SAP HANA, "SAP Hana Platform—Technical Overview—Driving Innovations in IT and in Business with In-Memory Computing Technology," 2012, 20 pages.
SAPUI5 beta—Simple Thing Inspector Component [online] GitHubGist 2011, [retrieved on Dec. 10, 2013]. Retrieved from the Internet: <URL: https://gist.github.com/elsewhat/2508753>.
'Thing-Based ULS and Customer Solutions in Sales OnDemand' [online] SAP Community Network 2012, [retrieved on Dec. 10, 2013]. Retrieved from the Internet: <URL: http://sen.sap.com/docs/DOC-28967>.
'Business Configuration (bc) sets' [online]. SAPTechies—SAP Support Portal 2007, [retrieved from the internet Dec. 10, 2013]. Retrieved from the Internet: <URL: http://www.saptechies.org/business-configuration-bc-sets>.
'RSS' [online]. Wikipedia [no date available] [retrieved from the internet Dec. 10, 2013]. Retrieved from the internet: <URL: http://en.wikipedia.org/w/index.php?title=RSS&oldid=442771302>.
'Web Feed' [online]. Wikipedia [no date available] [retrieved from the Internet Dec. 10, 2013]. Retrieved from the internet: <URL: http://en.wikipedia.org/w/index.php?title=Web_feed&ldid=445950305>.
'Atom (standard)' [online]. Wikipedia [no date available] [retrieved from the internet Dec. 10, 2013]. Retrieved from the internet: <URL: http://en.wikipedia.org/w/index.php?title=Atom_(standard)&oldid=443315222>.
'Introduction to Enhancement Spot Using PO Creation as an Example' [online]. SAP Bi Repository 2011 [Retrieved from the internet Dec. 10, 2013]. Retrieved from the internet <URL: http://dtwchan99.wordpress.com/2011/12/05how-to-use-enhancement-spot/>.
'Creation of Enhancement Spot, BADI Definition and Implementation in ECC 6.0' [online]. SAP Community Network 2013 [retrieved online Dec. 10, 2013]. Retrieved online <URL: http://wiki.sen.sap.com/wiki/display/Snippets/Creation+of+Enhancement+Spot,+BADI+Definition+and+Implementation+in+ECC+6.0>.
Extended European Search Report for Application No. EP13004320.1, dated Feb. 24, 2014, 7 pages.

\* cited by examiner

MANAGING FEED IN IN-MEMORY DATABASE SYSTEM

BACKGROUND

In many systems for enterprise resource planning (ERP), there is defined one or more objects, such as a customer account object. Occasionally, a user of the ERP system needs to share information regarding a customer account with other colleagues from his or her company who are also involved with that customer account. Some existing ERP systems use so-called "Text Collection" business objects (BOs) to allow the user to enter long texts in order to record something of interest. From a feature perspective entering a long text to a Text Collection BO accomplishes the task at hand, but it may be inconvenient for the user, or have other disadvantages.

SUMMARY

In a first aspect, a computer-implemented method for managing a feed in an in-memory database system includes: determining, in an in-memory database system, that a criterion for a feed event is met with regard to a business object handled by the in-memory database system; generating a feed event document in response to the determination; identifying at least one user in the in-memory database system who is a feed event subscriber regarding the business object; and forwarding the generated feed event document to the identified at least one feed event subscriber.

In a second aspect, a computer program product is embodied in a non-transitory computer-readable storage medium and includes instructions that when executed by a processor perform a method for managing a feed in an in-memory database system. The method includes: determining, in an in-memory database system, that a criterion for a feed event is met with regard to a business object handled by the in-memory database system; generating a feed event document in response to the determination; identifying at least one user in the in-memory database system who is a feed event subscriber regarding the business object; and forwarding the generated feed event document to the identified at least one feed event subscriber.

In a third aspect, a system includes: one or more processors; and a computer program product comprising instructions that when executed cause a method for managing a feed in an in-memory database system to be performed. The method includes: determining, in an in-memory database system, that a criterion for a feed event is met with regard to a business object handled by the in-memory database system; generating a feed event document in response to the determination; identifying at least one user in the in-memory database system who is a feed event subscriber regarding the business object; and forwarding the generated feed event document to the identified at least one feed event subscriber.

Implementations can include any or all of the following features. Determining that the criterion is met includes determining that the business object is updated by data replication in the in-memory database system. Determining that the criterion is met includes performing analytics calculation on the business object and updating the business object based on the analytics calculation. Determining that the criterion is met includes receiving local data regarding the business object that a user enters into the in-memory database system. The business object relates to a customer and the local data is based on sales-related information held by the user that is not previously stored in the in-memory database system. Determining that the criterion is met includes receiving a posting that a user enters regarding the business object using a posting function. The method further includes replicating transactional data to the business object in the in-memory database. The feed event document includes data serialized into a string.

The details of one or more implementations are set forth in the accompanying drawings and the description below. Other features and advantages will be apparent from the description and drawings, and from the claims.

DESCRIPTION OF DRAWINGS

FIGS. 2A-K show examples of managing feeds in an in-memory database.

Like reference symbols in the various drawings indicate like elements.

DETAILED DESCRIPTION

This document describes systems and techniques for managing feeds in an in-memory database. An in-memory database can offer significant advantages over other techniques of implementing a database, such as a much faster access to data. Moreover, providing feeds management in an in-memory database can further enhance its benefits. For example, feeds can be generated and viewed in the context of the particular relevant data, such as replicated data, analytical data, and/or locally enriched data.

Figure 1:
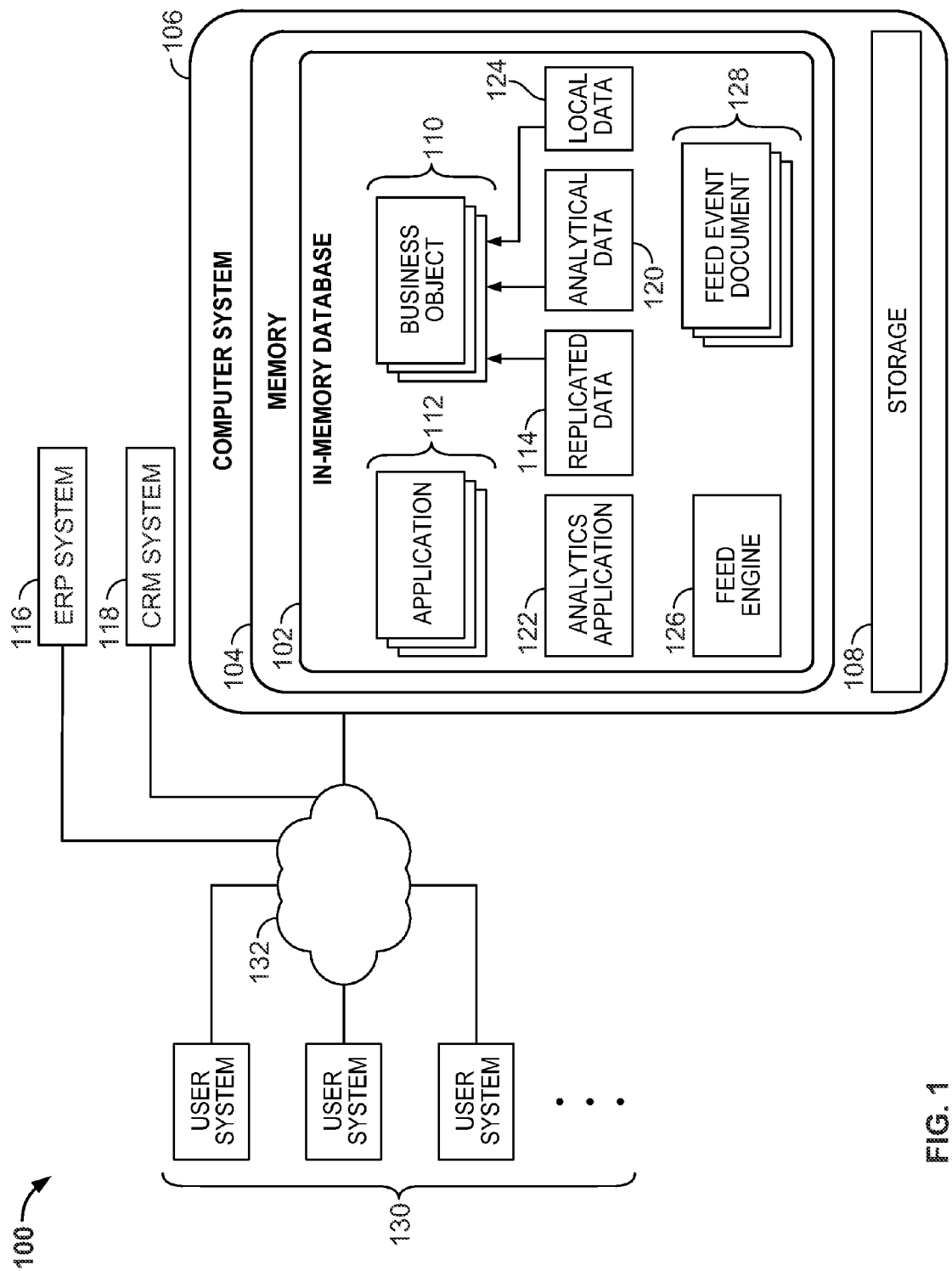
FIG. 1 shows an example of a system that can be used for managing feeds in an in-memory database.

FIG. 1 shows an example of a system 100 that can be used for managing feeds in an in-memory database 102. Here, the in-memory database 102 is implemented in a memory 104 of a computer system 106. That is, the computer system 106 may also have at least one other type of storage 108 (e.g., a disk or other repository), and the in-memory database 102 is installed, and executed, in the memory 104. Any suitable in-memory database technology and memory type can be used. For example, the SAP HANA real-time platform available from SAP AG can be used.

The in-memory database 102 handles one or more business objects 110. In some implementations, the business objects 110 are the same as or functionally equivalent to the Business Objects used in systems and applications from SAP AG. Any of the business objects 110 can be a sales order, billing document or a customer account, to name just a few examples. In some implementations, one or more applications 112 can be executed in the in-memory database 102, for example to provide user access to the business objects.

One or more of the business objects 110 can be updated with replicated data 114. In some implementations, an enterprise resource planning (ERP) system 116 and/or a customer relationship management (CRM) system 118 can provide data for replication. For example, transactional data regarding sales, or other business activities, can be replicated to the business object(s) 110 in the in-memory database 102.

One or more of the business objects 110 can be updated with analytical data 120. In some implementations, the in-memory database 102 includes an analytics application 122 that can perform analytics calculations on the business objects 110 and/or on other data relating to the business objects. For example, the analytics application 110 can use sales orders, billing documents and/or service documents, stored in the ERP system 116. Analytics calculations can include determining one or more business-related parameters such as, but not limited to, customer churn rate or profit margin.

One or more of the business objects 110 can be updated with local data 124. In some implementations, a user with access to the in-memory database 102 can enter sales-related information that the user knows. The local data 124 can include information that is not elsewhere stored in the system 100. For example, a sales manager may learn what the customer's procurement budget is, and because such information is not available in the ERP system 116 (or elsewhere in the system 100), the information can be added to the local data 124 for updating one or more of the business objects 110. Such information can be used for strategic work on a customer.

The in-memory database 102 includes a feed engine 126 that can generate one or more feed event documents 128. In some implementations, the feed event document 128 can include serialized information about the event that prompted the feed. For example, the feed event document(s) 128 can include data serialized into an extensible markup language (XML) string.

Each of the feed event documents 128 contains information intended to be distributed as a feed to one or more subscribers. Subscribers can operate one or more user systems 130 (e.g., a smartphone, tablet device, or personal computer). Each user system can communicate with the computer system 106, and optionally with the ERP system 116 and/or the CRM system 118, by way of one or more networks 132 (e.g., a local area network or the internet).

For example, receiving the replicated data 114 can trigger one of the feed event documents 128 in some circumstances, such as when the replicated data causes some parameter (or other indicator) to reach a threshold value. For example, the saving of a modified business object can trigger the feed event.

In some implementations, calculation of the analytical data 120 can indicate a feed event if one or more criteria are met. For example, if customer churn rate (e.g., the likelihood that the customer will take its business elsewhere) exceeds some alert level then this can be the basis for a feed event.

In some implementations, receipt of the local data 124 can be the basis for a feed event. For example, when a user enters information that enhances the business object or its related data in some way, this fact can be communicated to all subscribers.

FIGS. 2A-K show examples of managing feeds in an in-memory database. Beginning with FIG. 2A, it shows a home screen 200 that can present feeds, news and/or other information. In some implementations, the home screen 200 is customized to the role of a particular user. For example, a user who is a sales executive can be presented with the home screen and use it to manage sales strategies. The home screen here includes a feeds area 202, a notifications area 204, and a news area 206. One or more other areas can be included in some implementations.

The feeds area 202 here shows multiple feeds 208 that have been generated. That is, these feeds have been generated in an in-memory environment (e.g., the in-memory database 102 in FIG. 1) and are being distributed to subscribers (e.g., one or more of the user systems 130 in FIG. 1.) In this example, the feeds are organized from newest to oldest. For example, a first feed 208A indicates that the user "Ralf Halbedel" has changed the "Satisfaction" parameter for the customer "Barley Systems, Inc." from "Highly Satisfied" to "Partially Satisfied." That is, the user Ralf Halbedel may have received information directly or indirectly from the customer Barley Systems and has entered it into the system as a way of documenting this development and, knowing that the feed will be generated, as a way of quickly updating the other subscribers. This is an example of the local data 124 (FIG. 1). A second feed 208B indicates that this change has been registered in the system (in this feed, the user is more generally referred to as "mobile tester."

A third feed 208C indicates a development after the feeds 208A-B. Namely, the user Arnulf Schüller has posted a message to the other subscribers: "This is getting worse and worse," presumably in response to the prior feeds. The feed 208C is also labeled "Barley Systems, Inc." to indicate to the subscribers what the post relates to, in case the post itself does not explicitly mention the company name.

The user Arnulf Schüller also makes a data entry regarding the customer, in addition to generating the feed 208C. Namely, as indicated by a fourth feed 208D, he changes the customer satisfaction for Barley Systems from partially satisfied to not at all satisfied. The same user also enters a comment 208E about the feed he just generated: "will do something about it." In some implementations, a comment control 210 can be used to open a comment field where the message can be entered. Accordingly, the user can both update the system with the most recently available information, and generate feeds, posts and/or comments to the other subscribers to keep them up to date.

The notifications area 204 can include high-level summaries regarding the available information. In some implementations, one or more notifications can be based on information in the in-memory database 102 (FIG. 1). For example, the number of customers having a satisfaction rating of "unsatisfied" (or worse) can be indicated.

The news area 206 can be populated with one or more news items 214. In some implementations, the computer system 106 (FIG. 1) obtains the news items 214 from some source (e.g., from a news feed service) and presents them on the home screen 200. For example, the news items can be selected and/or filtered based on the user profile.

Figure 2A:
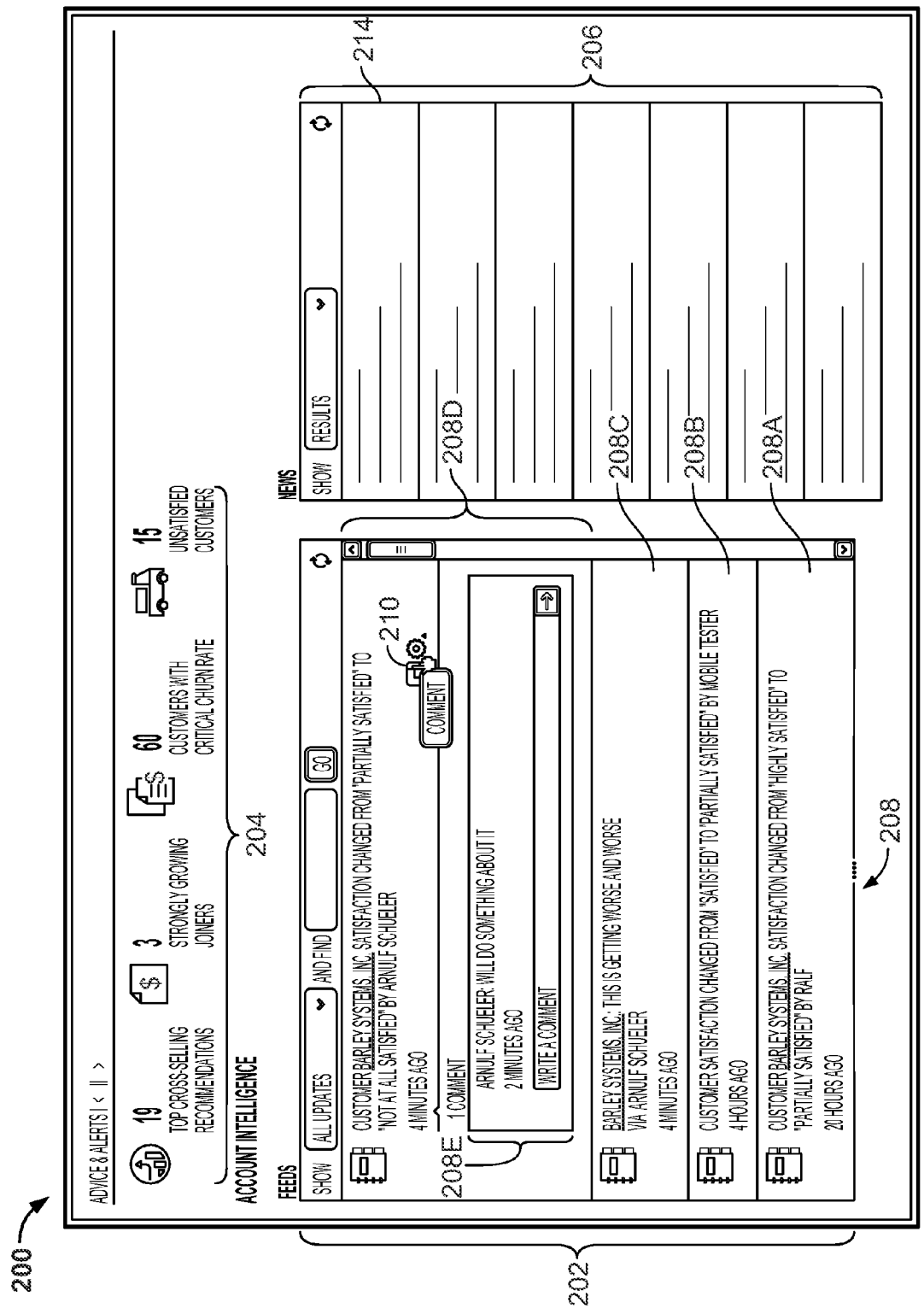
Figure 2B:
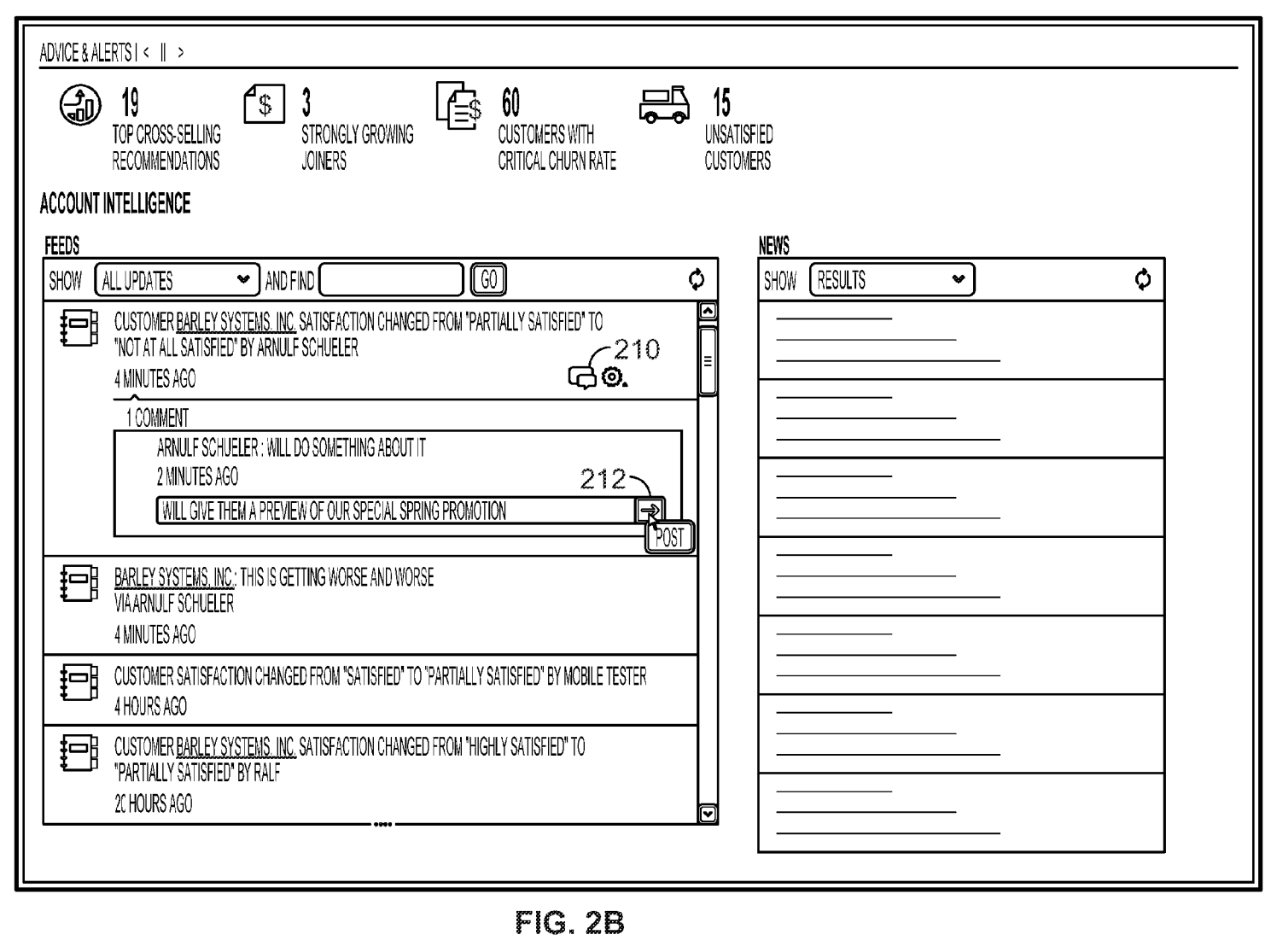
Figure 2C:
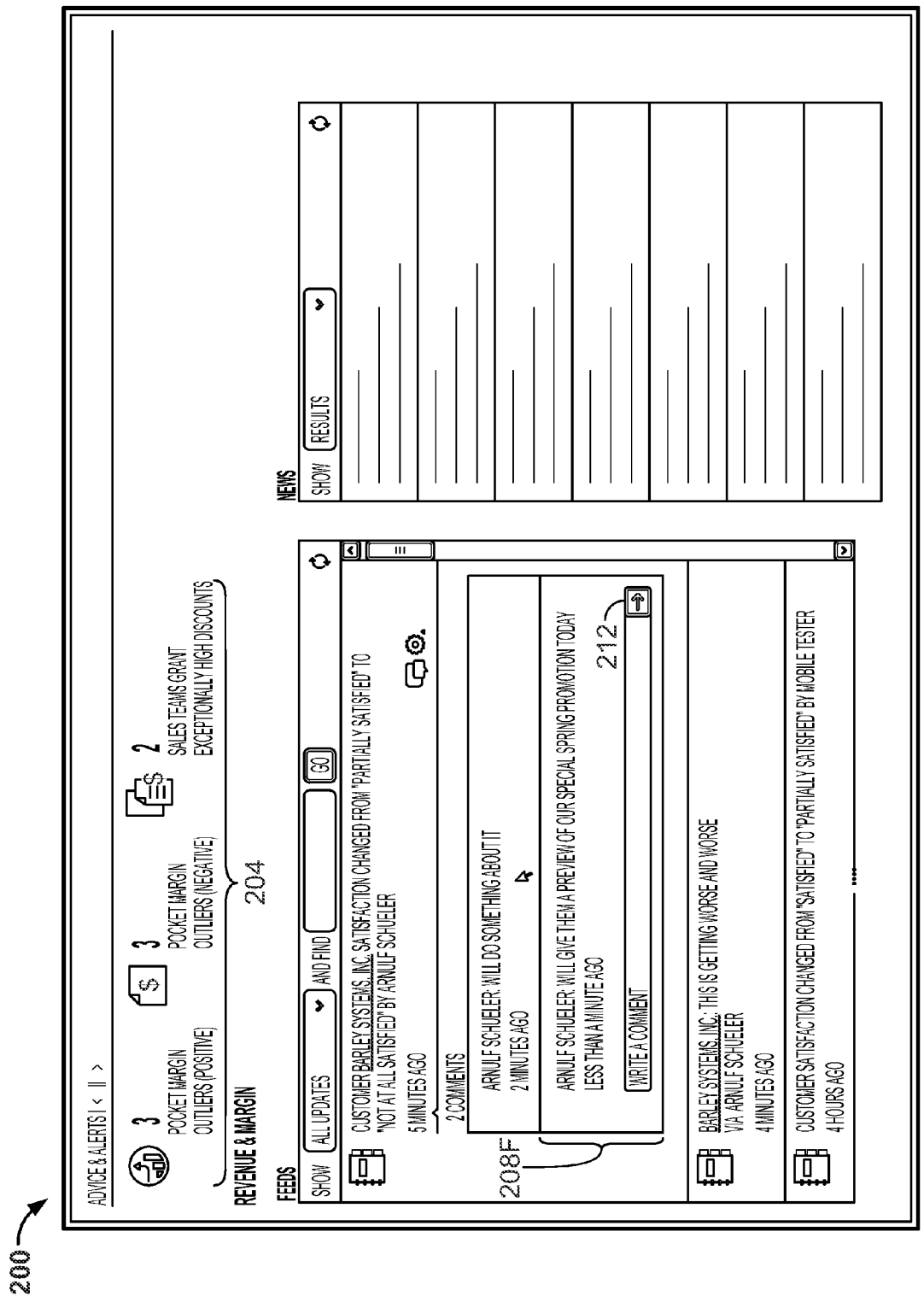

With reference also to, FIG. 2B, assume now that the user Arnulf Schüller wishes to post a more concrete message than in the comment 208E. The user therefore again activates the comment control 210, enters the message that he "will give them a preview of our special spring promotion," and thereafter submits the post using an enter control 212. This causes a feed event document for this posting to be generated and distributed to the subscribers. FIG. 2C shows the home screen 200 when a fifth feed 208F corresponding to the most recent post is presented. A user viewing the feed 208F can use the enter control 212 to post another comment. Also, the notification area 204 can automatically scroll information if more space is needed. For example, the notification area here shows other notifications than those in the two previous figures.

Figure 2D:
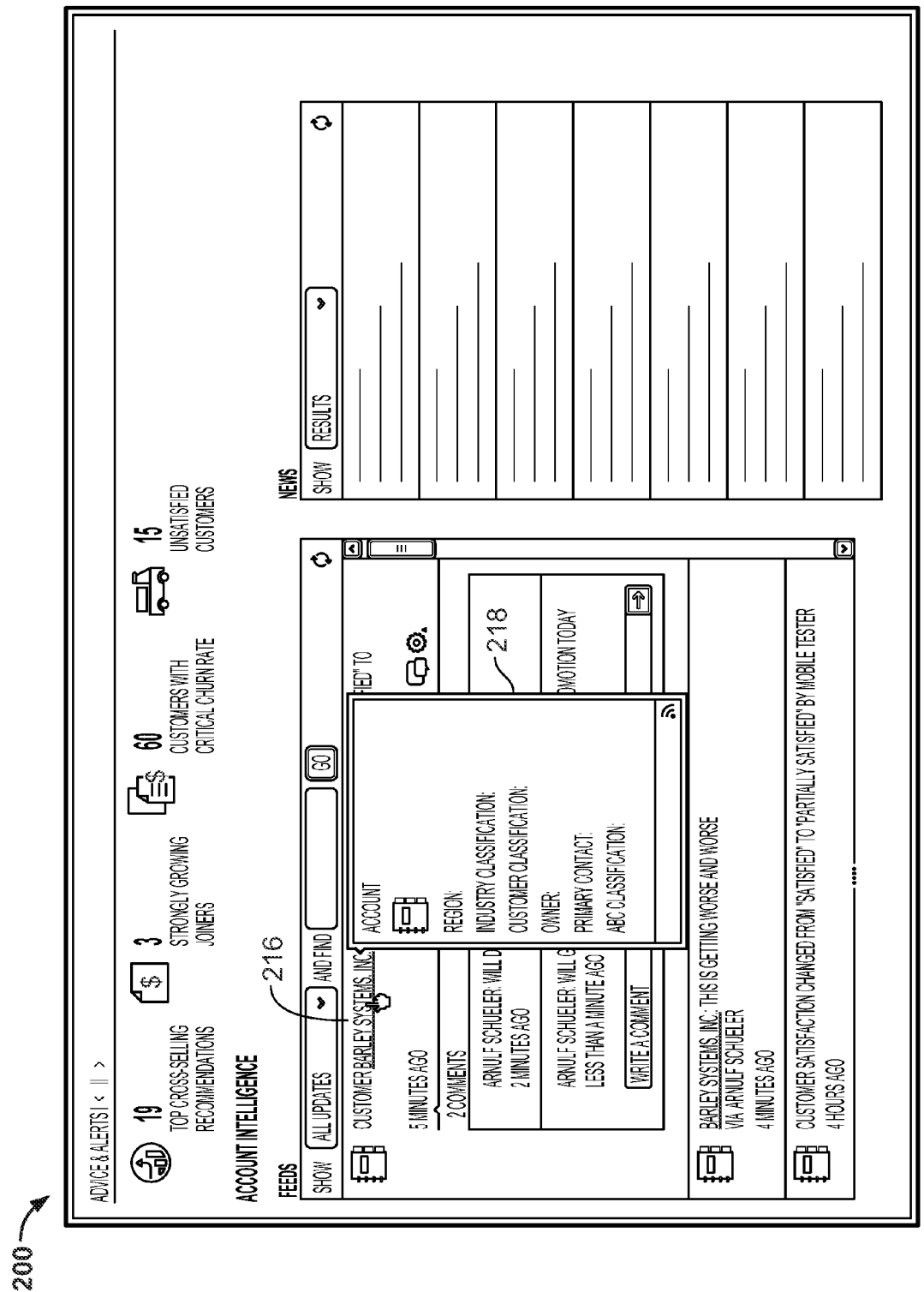

FIG. 2D shows that the home screen 200 can be used to navigate to relevant information about the current customer (here, Barley Systems.) Particularly, the user can select a customer input control 216 (e.g., a link) to access more information specific to this customer. In some implementations, this can allow the user to navigate to one or more of the business objects 110 (FIG. 1) as a way of exploring and managing the information available in the in-memory database 102 (FIG. 1). In response, a popup 218 can first be generated. In some implementations, the popup serves as a preview of information about the customer (i.e., the entity identified by the customer input control 216.)

Figure 2E:
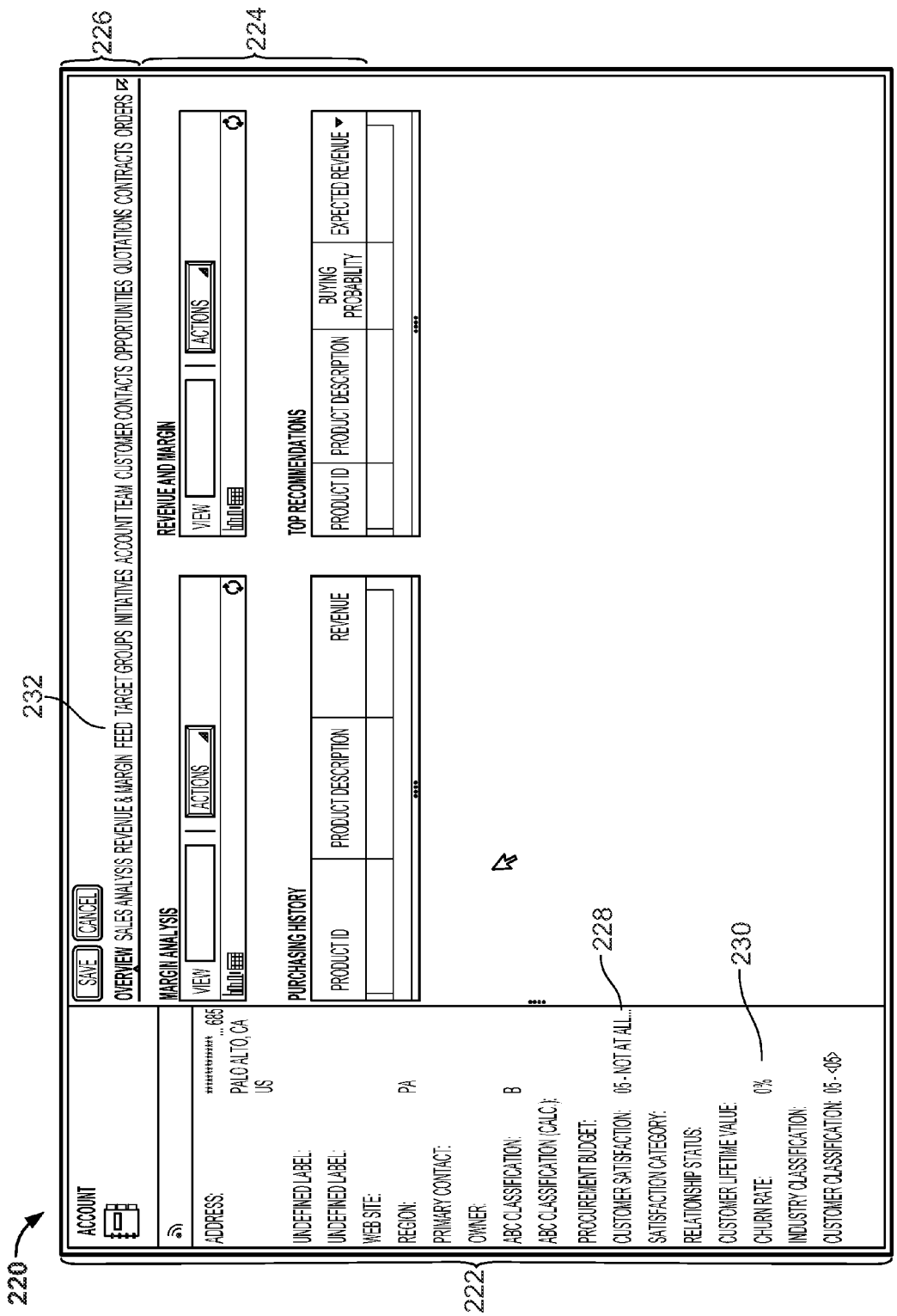

FIG. 2E shows an account screen 220 that is presented based on activating the customer input control 216 (FIG. 2D). The account screen 220 is specific to the particular customer (here, Barley Systems) and includes an information area 222, a data area 224 and a navigation area 226. In some implementations, the information area 222 includes knowledge obtained from the replicated data 114, analytical data 120 and/or local data 124 (all in FIG. 1.) Here, a customer satisfaction value 228 and a churn rate value 230 are presented, to name just two examples. Moreover, the information area 222 can allow the user to enter new values or change existing settings, for example as will now be described.

Assume that the user Arnulf Schüller has now given the customer a preview of the special spring promotion and that this had a positive effect on the customer's satisfaction. The user wants to update the system with this most recent status information about the customer, as well as notify the other subscribers about this development. The user therefore selects, in the navigation area 226, a feed control 232 to access the feeds for the current customer.

Figure 2F:
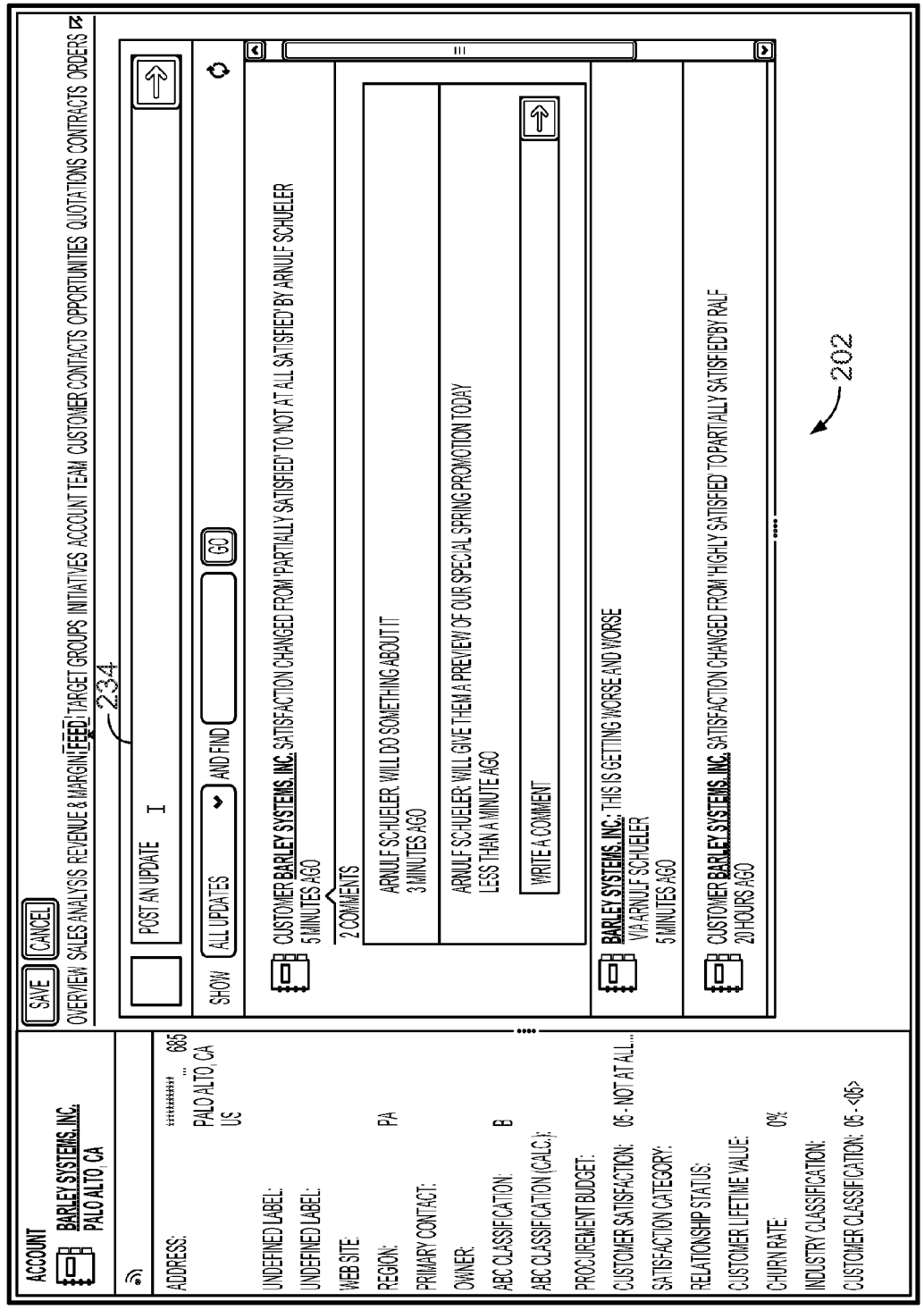
Figure 2G:
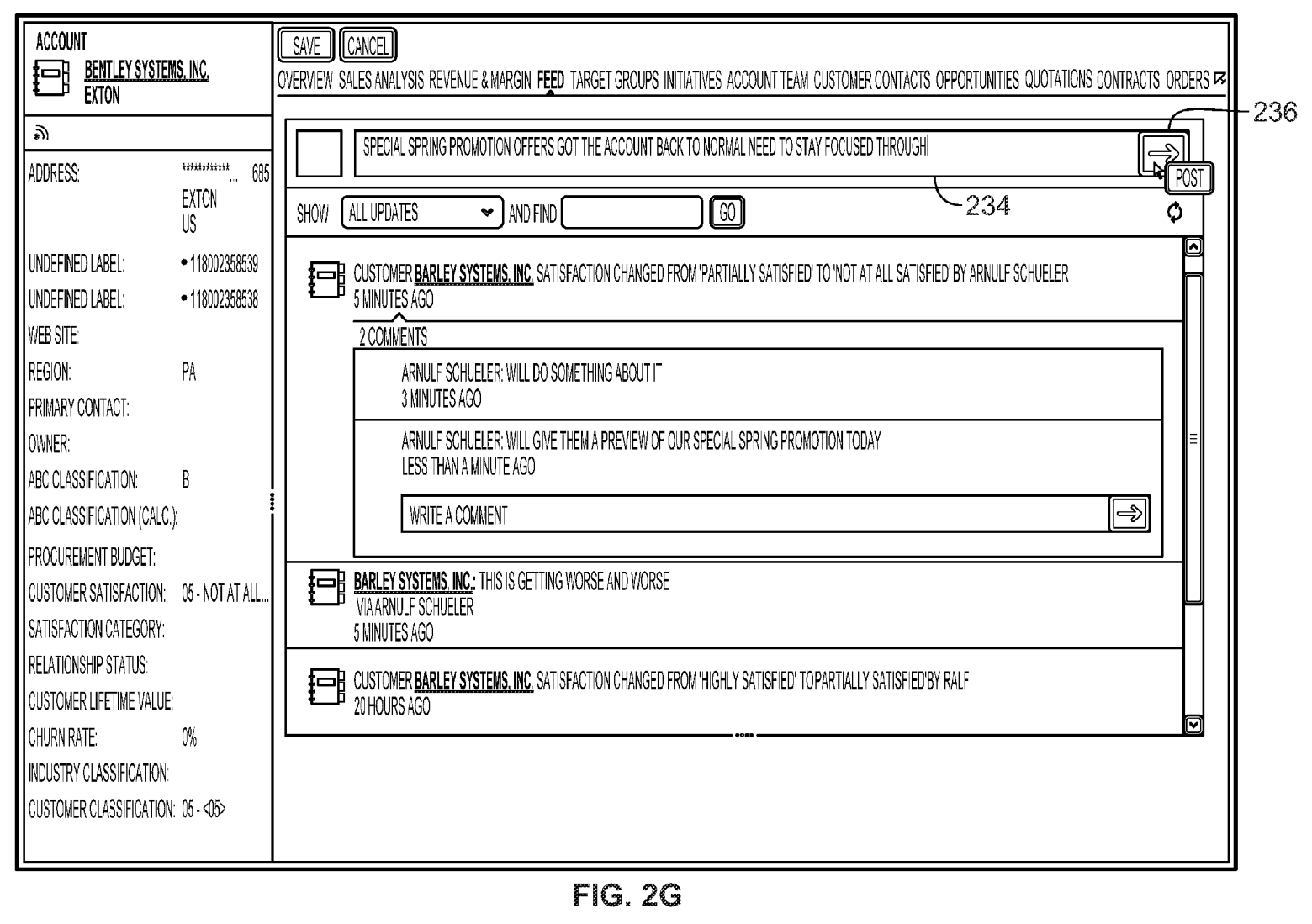

FIG. 2F shows the account screen 220 where the feeds 208 for the current customer are now presented. A comment field 234 is presented that can be used to post updates to one or more earlier feeds. FIG. 2G shows that the user has typed in the comment field 234:

"special spring promotion offer got the account back to normal. need to stay focused though."

Figure 2H:
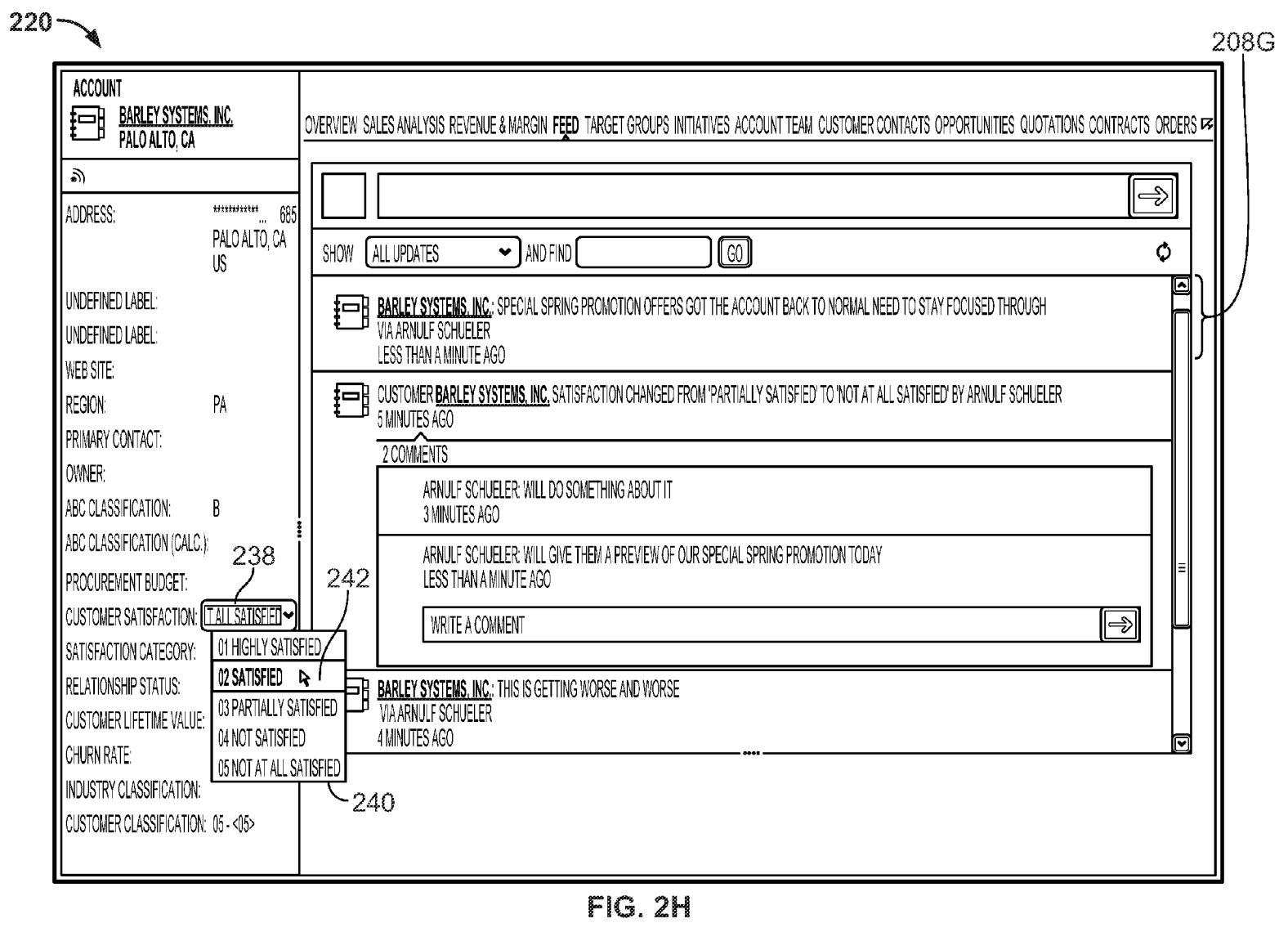

The user selects an input control 236 to post the update and have it distributed to the subscribers. FIG. 2H shows the account screen 220 where a sixth feed 208G based on the user's newly posted update is presented.

The user Arnulf Schüller also wishes to update the customer information regarding this development. He therefore selects an input control 238 that is associated with the customer satisfaction field. The input control 238 shows that "not at all satisfied" is the current value for the customer Barley Systems. Activating the input control 238 causes a menu 240 to be presented, listing the available values for this attribute, each associated with a respective identifier (01 through 05). The user selects an entry 242 labeled "Satisfied." FIG. 2I shows the account screen 220 where the input control 238 now reflects the newly updated "Satisfied" customer rating. The user selects a "Save" input control 244 to save the change that was entered.

Figure 2J:
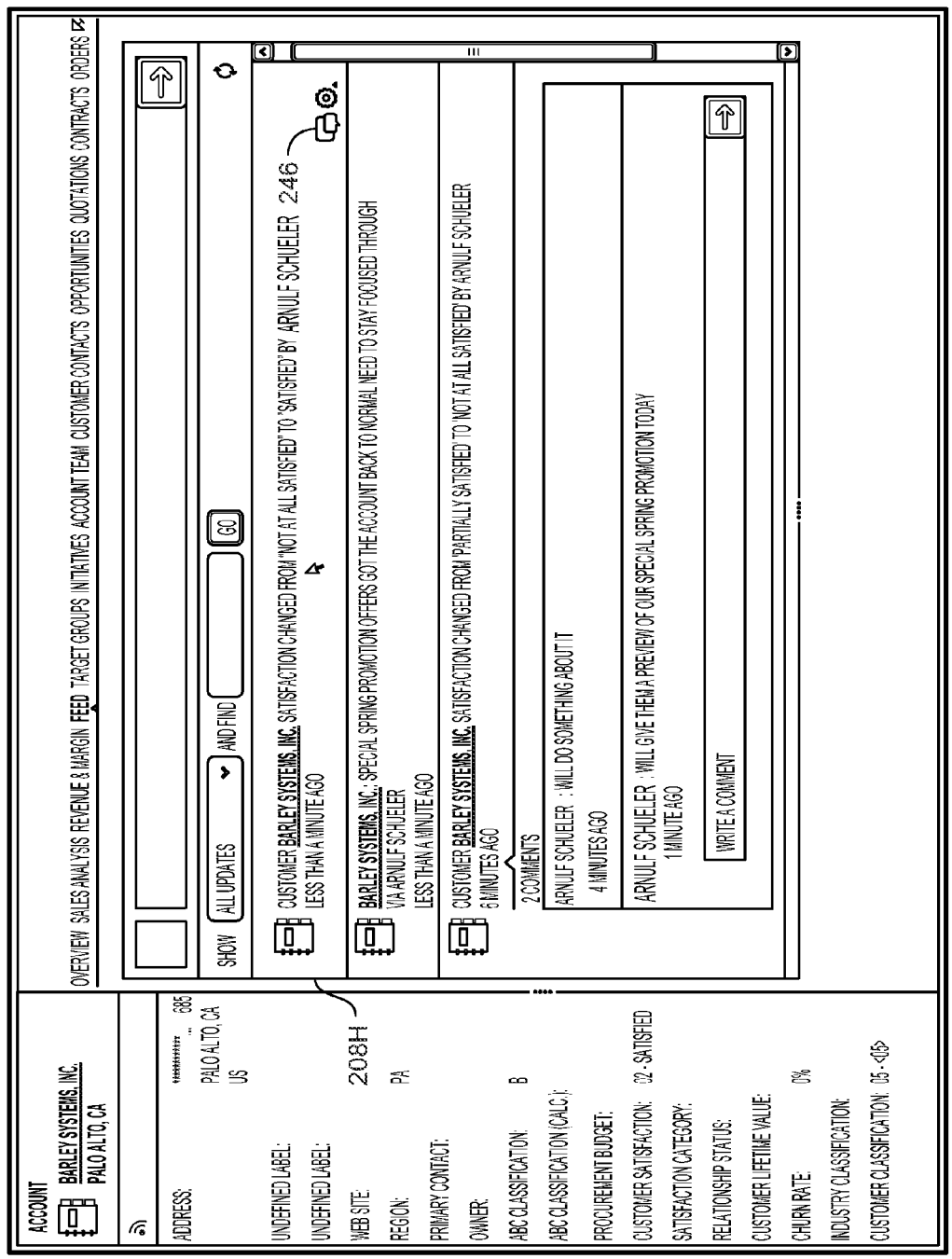

The saving of the customer satisfaction update triggers another feed event. That is, another feed event document is generated based on information in the in-memory database and is distributed to the subscribers. FIG. 2J shows that a seventh feed 208H has been generated. The feed 208H announces that the user Arnulf Schüller has changed the customer satisfaction for Barley Systems from not at all satisfied to satisfied. The feed 208H includes an input control 246 that a user (the same or a different one) can use to post a comment about the feed 208H.

Figure 2K:
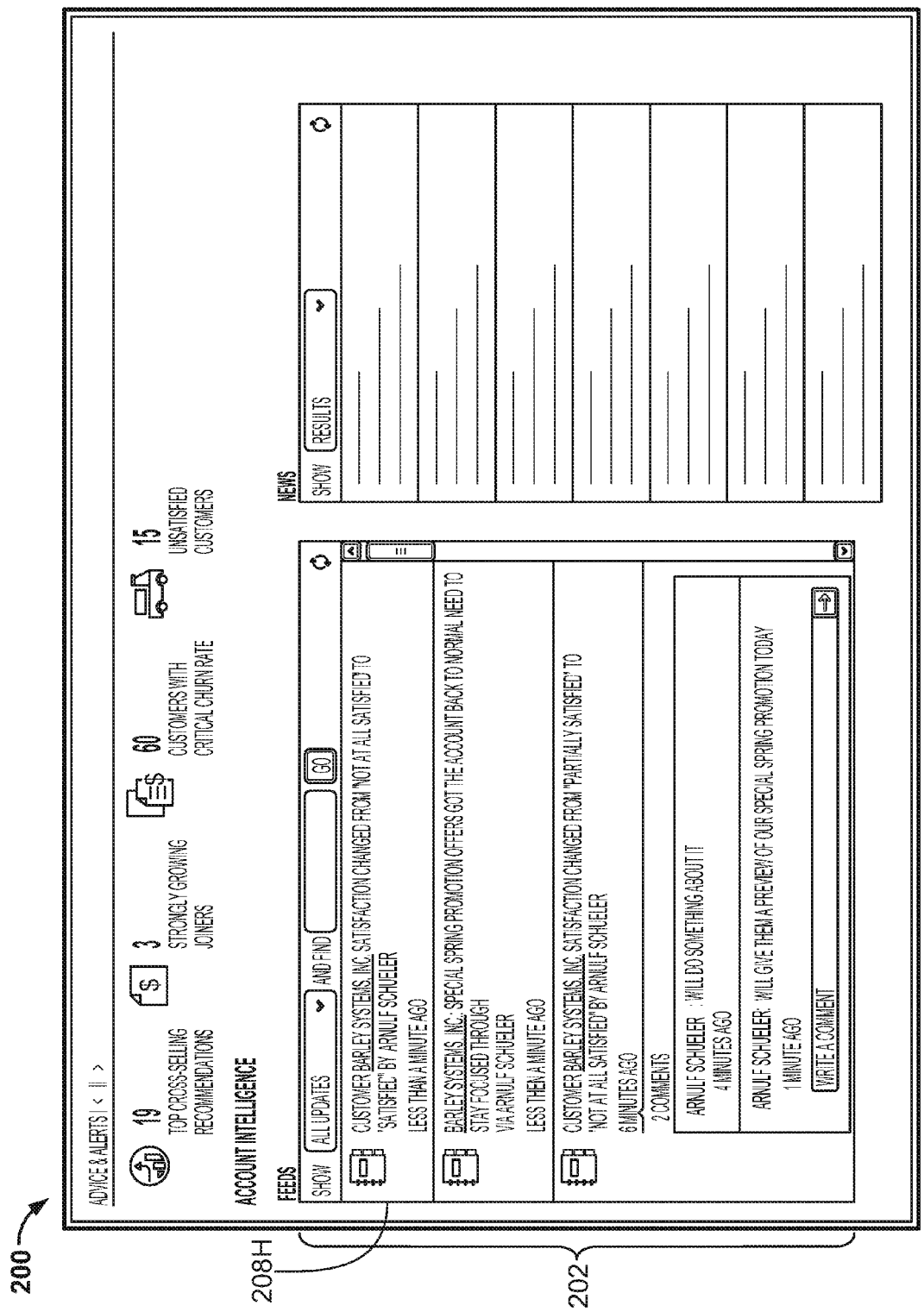

Other screens that contain feed content are updated accordingly when a new feed event occurs. FIG. 2K shows that the home screen 200 is updated to include also the feed 208H.

In short, the above example involves users who provide local data (e.g., the local data 124 in FIG. 1) to enhance the business object information available in an in-memory database system, and that this causes one or more feed events to be generated and distributed to subscribers. Other information can also or instead lead to feed events being generated. For example, if the analytics application 122 (FIG. 1) determines that some parameter or attribute regarding a particular business object (e.g., the churn rate for a particular customer) has reached a threshold, then an analytics alert can be triggered and this can in turn cause a feed event to be generated.

Figure 3:
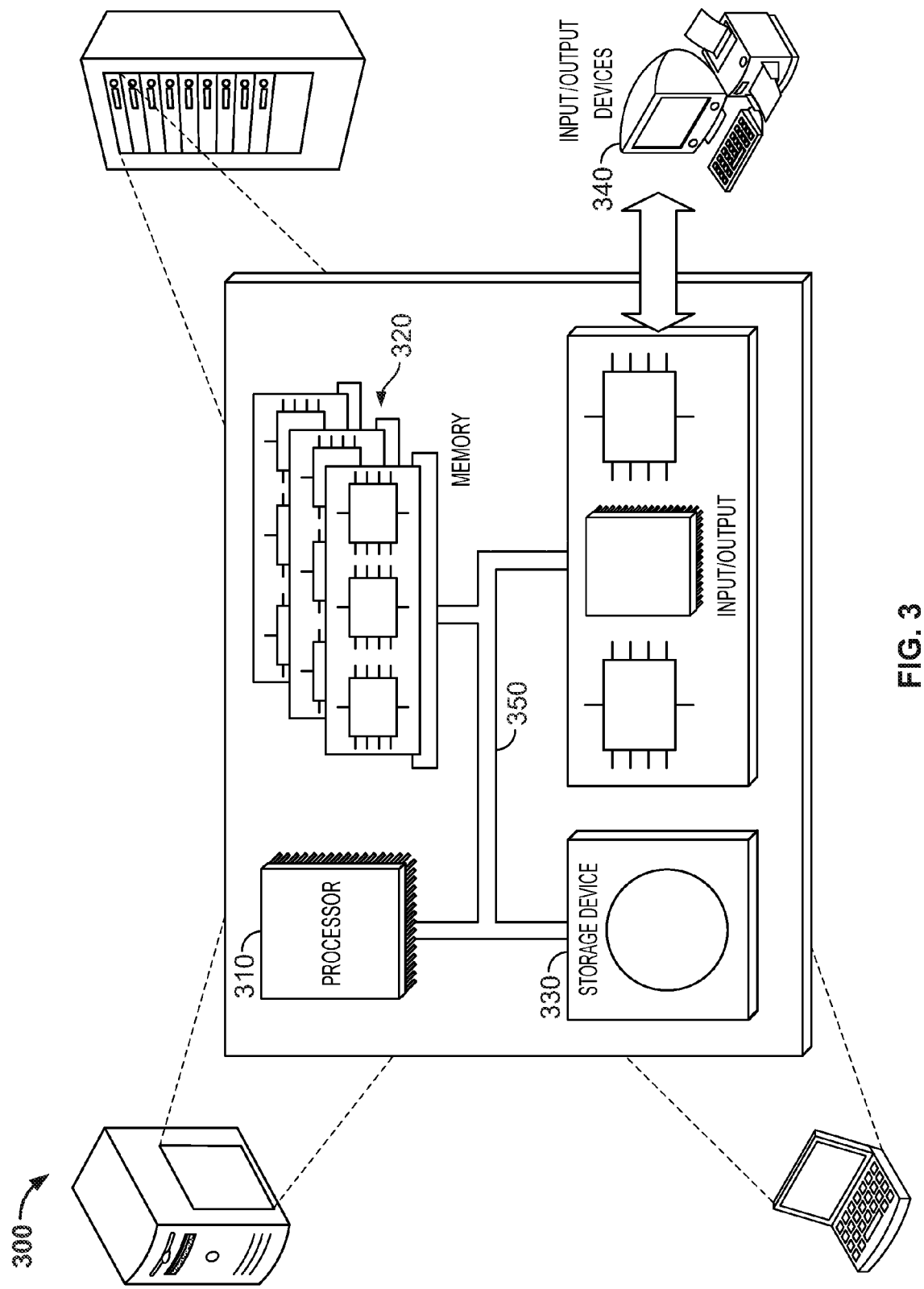
FIG. 3 is a block diagram of a computing system that can be used in connection with computer-implemented methods described in this document.

FIG. 3 is a schematic diagram of a generic computer system 300. The system 300 can be used for the operations described in association with any of the computer-implement methods described previously, according to one implementation. The system 300 includes a processor 310, a memory 320, a storage device 330, and an input/output device 340. Each of the components 310, 320, 330, and 340 are interconnected using a system bus 350. The processor 310 is capable of processing instructions for execution within the system 300. In one implementation, the processor 310 is a single-threaded processor. In another implementation, the processor 310 is a multi-threaded processor. The processor 310 is capable of processing instructions stored in the memory 320 or on the storage device 330 to display graphical information for a user interface on the input/output device 340.

The memory 320 stores information within the system 300. In some implementations, the memory 320 is a computer-readable medium. The memory 320 is a volatile memory unit in some implementations and is a non-volatile memory unit in other implementations.

The storage device 330 is capable of providing mass storage for the system 300. In one implementation, the storage device 330 is a computer-readable medium. In various different implementations, the storage device 330 may be a floppy disk device, a hard disk device, an optical disk device, or a tape device.

The input/output device 340 provides input/output operations for the system 300. In one implementation, the input/output device 340 includes a keyboard and/or pointing device. In another implementation, the input/output device 340 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of this disclosure. Accordingly, other implementations are within the scope of the following claims.

What is claimed is:

1. A computer-implemented method, comprising:
   displaying, by a computing system and in feed area of a first user interface, multiple feed items that each describe an event that relates to a particular company, wherein a particular one of the multiple feed items includes a first selectable input control that is configured to cause the computing system to navigate from the first user interface to a second user interface that displays additional information that relates to the particular company, wherein another one of the multiple feed items that are displayed in the feed area of the first user interface includes another selectable input control that is configured to cause the computing system to navigate from the first user interface to the second user interface;
   receiving, by the computing system, user activation of the first selectable input control;
   displaying, by the computing system and in the second user interface as a result of the user activation of the first selectable input control, the additional information that relates to the particular company, including:
      (i) multiple values that relate to the particular company and labels for the multiple values, and
      (ii) a second selectable input control that is configured to permit user input to change a particular one of the multiple values;
   receiving, by the computing system, user activation of the second selectable input control so as to change the particular one of the multiple values to a second value; and
   causing, by the computing system and as a result of the user activation of the second selectable input control, a feed event document to be distributed to computing devices of multiple subscribing users that have subscribed to the particular company, so as to cause each of the computing devices to display, among a plurality of feed items that describe events that relate to the particular company, a new feed item that indicates that the particular one of the multiple values has been changed to the second value.

2. The computer-implemented method of claim 1, wherein the multiple feed items are displayed in the feed area of the first user interface in order from newest to oldest.

3. The computer-implemented method of claim 1, wherein the selectable input control and the another selectable input control are links that each display a name of the particular company.

4. The computer-implemented method of claim 1, further comprising displaying, by the computing system and as a result of the user activation of the second selectable input control, the new feed item in the feed area of the first user interface.

5. The computer-implemented method of claim 1, wherein the new feed item includes a display of a name of a particular user of the computing system that provided the user activation of the second selectable input control so as to indicate that it was the particular user that changed the particular one of the multiple values to the second value.

6. The computer-implemented method of claim 1, further comprising displaying, by the computing system and in the first user interface as a result of the user activation of the first selectable input control, a popup window that includes a preview of the multiple values and the labels for the multiple values.

7. The computer-implemented method of claim 1, further comprising:
   displaying, by the computing system and as a result of the user activation of the second selectable input control, a menu that lists available values to which the particular one of the multiple values is able to be changed, wherein the menu lists the second value as one of the available values; and
   receiving, by the computing system, user selection of the second value in the menu.

8. The computer-implemented method of claim 1, wherein the new feed item that is to be displayed by each of the computing devices is configured to permit each of the subscribing users to submit a comment in response to the new feed item for distribution to other of the subscribing users.

9. A system comprising:
   a processor; and
   non-transitory computer-readable storage medium comprising instructions that, when executed by the processor, cause performance of operations that comprise:
      displaying, by a computing system and in feed area of a first user interface, multiple feed items that each describe an event that relates to a particular company, wherein a particular one of the multiple feed items includes a first selectable input control that is configured to cause the computing system to navigate from the first user interface to a second user interface that displays additional information that relates to the particular company, wherein another one of the multiple feed items that are displayed in the feed area of the first user interface includes another selectable input control that is configured to cause the computing system to navigate from the first user interface to the second user interface;
      receiving, by the computing system, user activation of the first selectable input control;

displaying, by the computing system and in the second user interface as a result of the user activation of the first selectable input control, the additional information that relates to the particular company, including:
(i) multiple values that relate to the particular company and labels for the multiple values, and
(ii) a second selectable input control that is configured to permit user input to change a particular one of the multiple values;

receiving, by the computing system, user activation of the second selectable input control so as to change the particular one of the multiple values to a second value; and causing, by the computing system and as a result of the user activation of the second selectable input control, a feed event document to be distributed to computing devices of multiple subscribing users that have subscribed to the particular company, so as to cause each of the computing devices to display, among a plurality of feed items that describe events that relate to the particular company, a new feed item that indicates that the particular one of the multiple values has been changed to the second value.

10. The system of claim 9, wherein the multiple feed items are displayed in the feed area of the first user interface in order from newest to oldest.

11. The system of claim 9, wherein the selectable input control and the another selectable input control are links that each display a name of the particular company.

12. The system of claim 9, wherein the operations further comprise displaying, by the computing system and as a result of the user activation of the second selectable input control, the new feed item in the feed area of the first user interface.

13. The system of claim 9, wherein the new feed item includes a display of a name of a particular user of the computing system that provided the user activation of the second selectable input control so as to indicate that it was the particular user that changed the particular one of the multiple values to the second value.

14. The system of claim 9, wherein the operations further comprise displaying, by the computing system and in the first user interface as a result of user activation of the first selectable input control, a popup window that includes a preview of the multiple values and the labels for the multiple values.

15. The system of claim 9, wherein the operations further comprise:

displaying, by the computing system and as a result of the user activation of the second selectable input control, a menu that lists available values to which the particular one of the multiple values is able to be changed, wherein the menu lists the second value as one of the available values; and receiving, by the computing system, user selection of the second value in the menu.

16. The system of claim 9, wherein the new feed item that is to be displayed by each of the computing devices is configured to permit each of the subscribing users to submit a comment in response to the new feed item for distribution to other of the subscribing users.

\* \* \* \* \*